Patented Mar. 29, 1949

2,465,905

UNITED STATES PATENT OFFICE 2,465,905

PROCESS OF MAKING WHEY FOOD PRODUCTS

Reginald E. Meade and Joseph M. Stringham, Appleton, Wis., assignors to Western Condensing Company, San Francisco, Calif., a corporation of California No Drawing. Application April 9, 1948, Serial No. 20,098

6 Claims. (Cl. 99—9)

This invention relates to a whey food product of controlled consistency, and to a method of controlling the consistency of condensed whey products independently of the solids content of the products.

Specifically, the invention deals with an animal and poultry food formed from whey by fermentation and control of lactose content.

The whey food products of this invention are characterized by controlled firmness, stability, smoothness, and flavors which are attractive to all types of live stock including animals and poultry.

The whey food products of this invention are further characterized by immunity to mold growth.

In the self feeding of poultry, it is highly desirable that the food materials have a firm consistency. The consistency should be such that the product will not flow under ordinary feeding conditions. At the same time, the product must not be sticky or tacky, so that the fowl may walk over it without embedding their feet in the feed.

In the feeding of swine, however, a much softer product, easily diluted to a wet mash or slop form, is desirable.

While the food value of whey has heretofore been recognized, it has been difficult and expensive to place the whey in a concentrated form of controlled consistency and solids content that is palatable to all types of animals.

According to this invention, the desired controlled consistency or firmness is obtained independently of the solids content of the product by incorporating fermented whey into whey that preferably has a reduced lactose content, and by heat treating the resulting blend. Heretofore, consistency could only be controlled by control of solids content, but the blending technique and denaturation of milk serum proteins according to this invention makes possible production of low solids content products having desired hard or soft consistencies. It is believed that the lactic acid producing microorganisms contribute water retaining polysaccharide gums in the fermented whey which aid in the control of the consistency of the product.

It is therefore an object of this invention to provide inexpensive condensed whey food products of controlled consistency and solids content to suit the type of feeding in which they will be utilized.

Another object of this invention is to provide condensed whey products of desired solids content and independently controlled consistencies ranging from firm poultry feed consistencies to soft, easily diluted consistencies for forming thin swine mash.

A still further object of the invention is to provide condensed whey products of controlled consistency, reduced lactose content, and containing only from 40 to 60% solids.

Another object is to provide a method of inexpensively concentrating whey into a firm plastic material of controlled sugar content.

A still further object is to provide a method of cheaply and easily preparing a condensed whey food product of controlled consistency, texture, and flavor.

In ordinary methods for condensing whey, a solids content of at least 60 to 70% is necessary to produce a firm bodied product. By means of our process, we may produce a firm product with a solids content as low as 40%, or even lower.

The relative amounts of protein and lactose in whey products influence the consistency of the products. High proportions of lactose may result in the formation of large lactose crystals which tend to reduce the firmness of the final product. The relative proportion of protein in the final product also has a definite bearing on the consistency, since the proteins, especially when denatured, are major factors in causing jellation of the product.

The mere removal of a portion of the lactose naturally present in the whey, with the attendant increase in proportion of protein, permits the formation of a firm product with a lower proportion of solids. For example, a sweet whey containing (on a dry basis) 70% lactose and 12% protein must be dewatered to a solids concentration of approximately 65% before a firm product is obtained. When the lactose content is reduced to about 55%, with a resulting increase in protein to 15–18%, a firm-bodied product may be obtained with a solids content between 58 and 60%.

In the process of our invention, however, we prefer to utilize a mixture of a partially desugared whey and a fermented whey product produced by the action of lactic acid producing microorganisms on whey. We have found that a fermented whey in which the lactic acid concentration is allowed to go to at least 1% is sufficient to yield a firm-bodied product when blended according to this invention. By varying the proportions of the ingredients of the mixture, we may vary the consistency of the final product over a wide range. The fermentation product alone will set into a firm, solid mass at about 30% solids. By the incorporation of from a few percent to about 25% by weight of fermented product with the partially desugared whey, we obtain, upon concentration, a product having a firm consistency with a solids content between about 60% and 40%, and a pH from about 4.2 to 4.7. Since, in the concentration step, the temperature of the product is raised to 160° F. and higher, and since the pH value of the product is close to the isoelectric point of the milk serum proteins, these proteins are denatured and their water-absorbing properties are increased.

In general, then, the process of our invention comprises fermenting whey with a lactic acid producing microorganism, terminating the fermentation, blending the fermentation product with a desugared whey, concentrating the blend under conditions which modify the milk serum proteins to increase their water-absorbing properties, and allowing the concentrate to set into a mass of controlled consistency and solids content.

The lactose content of the whey may be reduced by any known means, preferably through partial crystallization of the lactose and removal by any suitable means, or by fermentation.

We have found, further, that fermentation of the whey in the presence of propionate radical producing microorganisms will successfully inhibit mold growth. The propionate radical content required is inversely proportional to the solids content of the product. A solids content of 55% requires about 0.3% propionates, while a solids content of 50% requires about 0.5% propionates.

The propionate in the product serves the dual purpose of inhibiting mold growth and also imparting flavor to the product. The propionates alone are relatively ineffective in controlling the pH, the control of which is necessary to impart stiffness to the final product and to inhibit bacterial growth.

In one mode of operation in accordance with the present invention, a whey, such as rennet or casein whey, is subjected to the action of propionic radical producing microorganisms and lactic acid producing microorganisms, either concurrently or in separate stages while controlling the pH in the range of activity of the organisms, terminating the reaction when the propionate radical concentration and lactic acid concentration are sufficient to yield concentrations of at least 0.3% propionate and 1.0% lactic acid in the final fermentation product, blending this fermentation product with a whey concentrate from which a portion of its original sugar content has been removed, and concentrating the blend under temperature and pH conditions which modify the milk serum proteins to increase their water-absorption and retention properties.

The preferred lactic acid producing bacteria to be used in accordance with this invention are *Lactobacillus bulgaricus, Lactobacillus arabinosus,* and *Streptococcus lactis*. The propionate radical producing microorganisms are preferably *Propionibacterium shermanii,* and *Propionibacterium zeae*.

The process of the present invention may be more clearly understood by reference to the following examples:

Example 1

3300 lbs. of sterile whey was inoculated with 18 liters of a 24-hour culture of *Propionibacterium shermanii*. Fermentation was continued for 36 hours at 37° C. with periodic additions of a total amount of 16 lbs. of calcium carbonate. At the end of this time, a test showed the presence of 0.28% dissolved calcium in the whey. The tank temperature was then raised to 60° C. for 5 minutes and was thereafter allowed to fall to 45° C., thus terminating the propionic fermentation. While at a temperature of 45° C., the whey was inoculated with a 24-hour culture of *Lactobacillus bulgaricus*. A buffer salt, sodium acetate, in an amount of 0.5% was added, and fermentation was continued for 48 hours at which time the titratable acidity amounted to about 1.1% acid as lactic acid, as determined by titrating a boiled sample with 0.1% normal sodium hydroxide solution to a phenolphthalein end point. The pH of the mixture measured immediately after the addition of sodium acetate was 4.35. The fermentation liquor had a pH of 4.0 and contained 6.76% total solids, 1.10% acid (as lactic acid), 3.30% lactose monohydrate, 0.63% protein (determined as nitrogen content ×6.25) together with 1.24% ash.

After this double fermentation had been completed, the resulting liquor was blended with 5000 lbs. of an albumin concentrate or desugared whey (320 lbs. of sugar having been removed from the original whey by partial crystallization). This concentrate contained 46.2% total solids. The resulting blend contained 29.5% total solids and was dehydrated in a concentrator at temperatures above 160° F. to a total solids content of 58.1%. This final product had a pH of 4.7 and contained 0.3% propionic acid (as calcium propionate), 3.00% acid (as lactic acid), 35.60% lactose monohydrate, 8.76% protein (nitrogen ×6.25), and 8.07% ash. The product set, after a period of time (about 24 hours), to a firm, plastic consistency, and did not support mold growth during a prolonged storage period.

Example 2

5,200 lbs. of sterile whey was inoculated with a 24 hour culture of *Propionibacterium shermanii* and allowed to ferment at 37° C. for about 36 hours. A total amount of 20 lbs. of calcium hydroxide was added periodically to maintain the pH in the vicinity of 5.0. The temperature was then brought to 60° C. and held there for 15 minutes, after which the temperature was allowed to drop to 45° C. The mass was thereafter inoculated with *Lactobacillus bulgaricus*. No sodium acetate was added. A titratable acidity of 1.1% was reached in 24 hours.

The fermented material contained 5.48% total solids, 1.20% acid (as lactic acid), 2.52% lactose monohydrate, 0.64% protein (determined as nitrogen content ×6.25) and 0.98% ash.

4,500 lbs. of the fermented material were then blended with 6,200 lbs of a partially desugared albumin concentrate containing 50.2% total solids. The blend was then concentrated by evaporation at temperatures above 160° F. to form a finished composition having a pH of 4.68 and containing 57.48% total solids, 2.80% acid (as lactic acid), 36.50% lactose monohydrate, 7.51% protein (nitrogen ×6.25) and 6.60% ash. This material was immune to mold growth and set to a firm smooth textured plastic consistency within several hours.

*Example 3*

450 pounds of rennet whey was heated with agitation in a stainless steel tank to a temperature of 60° C. and maintained at that temperature for 30 minutes. The whey was cooled at 37° C. after which it was inoculated with three liters of a 24 hour mixed culture containing *Lactobacillus bulgaricus, Lactobacillus arabinosus, Streptococcus lactis, Propionibacterium shermanii* and *Propionibacterium zeae*. After seeding, the pH was determined at 4.65.

The addition of 0.32 pound of calcium hydroxide brought the pH to 5.75. Active fermentation of the mixture began in three hours. The pH of the culture was maintained in the range of from 5.0 to 6.0 by the addition of calcium hydroxide until 8.4 pounds had been added. This required about 46 hours.

During the next 10 hours, there was considerable evolution of gas and a strong odor characteristic of propionic acid appeared. The pH rose steadily, and fermentation was discontinued when the pH reached 6.25.

The culture was briefly heated to about 60° C. to liberate some of the carbon dioxide from solution and to reduce the amount of foaming. 360 pounds of the ferment was mixed with 238 pounds of an albumin concentrate (desugared whey) containing 58.9% solids. The mixture was then concentrated by evaporation at temperatures above 160° F. to 52% total solids. An additional 80 pounds of the ferment, which had not been heated in order to preserve volatile propionate fractions, was then added to the concentrated mixture.

The resulting blend jelled into a firm plastic mass in 24 hours. It showed no mold or yeast development after storage for more than a month at room temperature.

An analysis of the final blend showed 43.6% total solids; 2.8% acids (as lactic acid), 20.8% lactose monohydrate, 7.1% protein (nitrogen × 6.25) and 8.3% ash.

*Example 4*

5,200 lbs. of sterile whey were inoculated with an 18-liter culture of *Lactobacillus bulgaricus*. The starting pH of the 5,200 lb. culture was 6.19 and the acid concentration, determined as lactic acid, was 0.64%. The tank temperature was maintained at 45° C. throughout the fermenting operation. Active fermentation started in about 8 hours, and the pH of the culture was maintained in the range of from 4.5 to 5.0 by periodic additions of calcium hydroxide until 20 lbs. had been added. This addition of calcium hydroxide gave a calcium concentration of about 0.25% in the culture, and accounted for approximately 1% of the lactose as calcium lactate. 9 hours were required to complete the calcium hydroxide additions. 8 hours were thereafter required to bring the acid (determined as lactic acid) to about 1%. Total fermentation time was 25 hours.

The 5,200 lbs. of the fermented material was then mixed with 7,000 lbs. of an albumin concentrate or desugared whey having a solids content of 50.2%. This desugared whey contained only about 80% of the original lactose content.

The blend of fermented material and desugared whey was then concentrated at temperatures of about 120° F. to a solids content of 59.37%. The material set in 24 hours to a firm, smooth-textured, plastic mass. Since the ingredients of the blend had previously been subjected to temperatures above 160° F., heat treatments to denature the serum proteins had been completed prior to the concentration, and lower concentrating temperatures were sufficient.

The final product had the following analysis:

| | | |
|---|---|---|
| Total solids | Percent | 59.37 |
| Lactose monohydrate | do | 36.90 |
| Protein (N × 6.25) | do | 7.96 |
| Acid (as lactic) | do | 3.40 |
| Ash | do | 7.31 |
| pH | | 4.5 |

From the above descriptions and examples it will be understood that this invention provides a whey food product of a desired controlled consistency or degree of firmness independently of the concentration of solids in the product and makes possible the production of smooth-textured firm or jelled whey products containing from 40 to 60% solids.

We claim as our invention:

1. The method of making a stable condensed whey product which comprises fermenting whey with lactic acid producing microorganisms and propionic acid producing microorganisms and concentrating the fermented product to a relatively low solids content adapted to gel without added agents.

2. The method of controlling the consistency of condensed whey products without concentrating the products to a high solids content which comprises blending partially delactosed whey with fermented whey, heating the blended mixture at temperatures not less than about 160° F. at a pH level of 4.2 to 4.7 to place the proteins in a water absorptive form, concentrating by evaporation to a solids content of between 40 to 60%, and allowing the blend the gel.

3. The method of making a condensed whey food product of a desired selected consistency and a controlled solids content which comprises fermenting whey with a lactic acid producing microorganism and a propionic acid producing microorganism, adding appreciable amounts up to 25% by weight of the fermented whey to partially desugared whey containing less than about 80% of the normal lactose content of whey, concentrating the resulting blend to a solids content of from 40 to 60%, and allowing the concentrated mass to gel.

4. The method of making a stable condensed whey product which comprises fermenting whey which has been heated to not less than 160° F. with lactic acid producing microorganisms, maintaining the pH of the culture in the range of 4.5 to 5.0, blending the fermented whey with partially delactosed whey which has been heated to not less than 160° F., and concentrating the blend by evaporation to a solids content of about 40% to 60%.

5. The method of making a stable condensed whey product from fermented whey and delactosed whey under conditions which modify the milk serum proteins to increase their water absorption and retention properties, the process including fermenting whey with lactic acid producing microorganisms, blending the fermented whey with partially delactosed whey, and concentrating the blend to a solids content of between 40% to 60%, the conditions including heating the whey ingredients to a temperature not less than 160° F. at a point in the process not later than the concentration step while maintaining the pH value thereof close to the isoelectric point of the milk serum proteins.

6. The method of making a stable condensed whey product having the form of a gel comprising fermenting a quantity of whey with a lactic acid forming microorganism, providing partially delactosed whey in an amount having a predetermined ratio to the amount of fermented whey, blending the fermented whey with the delactosed whey, concentrating the blend by evaporation to form about 40% to 60% solids and then permitting the blend to set to form a gel, the milk proteins of the product being modified by heat treatment to a temperature not less than about 160° F. to increase their water absorptivity.

REGINALD E. MEADE.
JOSEPH M. STRINGHAM.

REFERENCES CITED

The following references are of record in the file of this patent:

UNITED STATES PATENTS

| Number | Name | Date |
| --- | --- | --- |
| 2,124,820 | Hellinger | July 26, 1938 |
| 2,449,142 | Pollard et al. | Sept. 14, 1948 |

FOREIGN PATENTS

| Number | Country | Date |
| --- | --- | --- |
| 357,498 | Great Britain | 1930 |
| 477,863 | Great Britain | 1938 |